(12) United States Patent
Liu

(10) Patent No.: US 10,093,038 B2
(45) Date of Patent: Oct. 9, 2018

(54) MOULD WITH A HEATING DEVICE

(71) Applicant: Chung-Nan Liu, Yunlin County (CN)

(72) Inventor: Chung-Nan Liu, Yunlin County (CN)

( * ) Notice: Subject to any disclaimer, the term of this patent is extended or adjusted under 35 U.S.C. 154(b) by 79 days.

(21) Appl. No.: 15/231,761

(22) PCT Filed: Jan. 6, 2015

(86) PCT No.: PCT/CN2015/070138
§ 371 (c)(1),
(2) Date: Aug. 8, 2016

(87) PCT Pub. No.: WO2015/120754
PCT Pub. Date: Aug. 20, 2015

(65) Prior Publication Data
US 2016/0368173 A1 Dec. 22, 2016

(30) Foreign Application Priority Data
Feb. 11, 2014 (CN) .......................... 2014 1 0047811

(51) Int. Cl.
*B29C 33/02* (2006.01)
*B29C 43/52* (2006.01)
(Continued)

(52) U.S. Cl.
CPC .............. *B29C 33/02* (2013.01); *B29C 43/52* (2013.01); *H05B 3/06* (2013.01); *H05B 3/12* (2013.01);
(Continued)

(58) Field of Classification Search
CPC .. H05B 3/12; H05B 3/06; B29C 33/02; B29C 43/52; B29C 2033/023; B29C 33/06;
(Continued)

(56) References Cited

FOREIGN PATENT DOCUMENTS

| CN | 103072222 A | * | 5/2013 |
| CN | 203057550 U | * | 7/2013 |
| JP | 60174624 A | * | 9/1985 |

OTHER PUBLICATIONS

Machine Translation of CN-103072222-A (Year: 2013).*
Machine Translation of JP60174624A (Year: 1985).*
Machine Translation of CN-203057550-U (Year: 2013).*

* cited by examiner

*Primary Examiner* — Matthew J Daniels
*Assistant Examiner* — Leith S Shafi
(74) *Attorney, Agent, or Firm* — Bruce Stone LLP; Joseph Bruce

(57) ABSTRACT

A mould with a heating device is disclosed. The mould mainly comprises an upper mould, a lower mould, a conductive layer, an insulating layer, at least a pair of electrodes capable of being arranged in the conductive layer in a conductive manner, at least one first conductive unit and at least one second conductive unit. As a first outer conductive section of each first conductive unit and a second outer conductive section of each second conductive unit can penetrate through a conductive side surface of the conductive layer and are located on a same side surface of the conductive layer, the first conductive unit is provided with a first inner conductive section corresponding to a cavity of the lower mould, the second conductive unit is closer to the insulating surface of the conductive layer compared with the first conductive unit, a current path flowing through the conductive layer can be controlled by means of configuration of the first and second conductive units, so that the current is relatively gathered on the surface of the conductive layer in a centralized manner, particularly gathered in the cavity in the centralized manner. Therefore, the cavity is preheated from room temperature to working temperature, (Continued)

and the purpose of enhancing the heating effect of a die cavity heating area is realized.

8 Claims, 17 Drawing Sheets

(51) Int. Cl.
    *H05B 3/06*     (2006.01)
    *H05B 3/12*     (2006.01)

(52) U.S. Cl.
    CPC .................. *B29C 2033/023* (2013.01); *B29K 2995/0005* (2013.01); *B29K 2995/0007* (2013.01); *B29K 2995/0013* (2013.01)

(58) Field of Classification Search
    CPC ............ B29C 33/08; B29K 2995/0007; B29K 2995/0005; B29K 2995/0013
    See application file for complete search history.

MOULD WITH A HEATING DEVICE

BACKGROUND OF THE INVENTION

Field of the Invention

The present invention relates to a mould used in thermoplastic or thermosetting process, and more particularly to a mould with a heating device.

Related Prior Art

Conventional methods or devices for heating a mould all include the use of high frequency induction magnetic wave type heat conductive coil inside the mould or on the parting surface of the mould, and the heat conductive coil is connected to a high frequency power source to provide high frequency current to the heat conductive coil, so that the mould can be heated from room temperature to a desired temperature, and the heating is restricted in the contact surface between the mould and the material.

However, using high frequency furnace as heat device may have no safety concern, but has a relatively high cost. Besides, high frequency wave is only effective to shallow or flat mould, and unsuitable for moulds with complicated inner surface. The use of high frequency has other disadvantages: such as uneven heating, namely, uneven mould surface temperature distribution, instable induction current, long heating time, and high power consumption.

Therefore, a heating device disclosed in WO 2010/104129A1 includes: a conductive layer, an insulating layer, two electrodes and two conductive units disposed in an upper mould or a lower mould. The conductive units have a resistance coefficient smaller than a resistance coefficient of the conductive layer, which makes the surface temperature distribution of the upper or lower mould uniform. However, the conductive units are disposed at two sides of the conductive layer and are not located corresponding to the mould cavity. Therefore, in addition to the fact that the power source arrangement is inconvenient, heating current cannot be collected, and as a result, the heating effect in the mould cavity is not good.

The present invention has arisen to mitigate and/or obviate the afore-described disadvantages.

SUMMARY

The present invention is aimed at providing a mould with a heating device, which is capable of improving the heating effect of the heating portion of the mould.

Therefore, a mould with a heating device in accordance with the present invention, comprises: a conductive layer including a first conductive surface, a second conductive surface opposite to the first conductive surface, a heating portion disposed on the first conductive surface, and a first conductive lateral surface and a second conductive lateral surface which are connected to the first and second conductive surfaces; an insulating layer mounted on the conductive layer in an insulated manner, and including a first insulating surface connected to the second conductive surface, an opposite second insulating surface, and a first insulating lateral surface and a second insulating lateral surface which are connected to the first and second insulating surfaces, and located on the same side as the first and second conductive lateral surfaces; the heating device including at least one first conductive units and at least one second conductive units; wherein the first conductive units includes: a first electrode portion electrically connected to the first conductive lateral surface, a first connecting portion electrically connected to the first electrode portion and insulated from the conductive layer, a first inner conductive section electrically connected to the first connecting portion and disposed inside the insulating layer and aligned to the heating portion, and a first outer conductive section electrically connected to the first inner conductive section and located outside the second insulating lateral surface; the second conductive units includes: a second electrode portion electrically connected to the second conductive lateral surface, and a second outer conductive section electrically connected to the second electrode portion and located outside the second insulating lateral surface and insulated from the first outer conductive section.

Preferably, the heating portion is a recess recessed from the first conductive surface toward the second conductive surface.

Preferably, the mould further includes an upper mould and a lower mould which can move toward or away from the upper mould, and the lower mould consists of the conductive layer and the insulating layer.

Preferably, the heating portion of the conductive layer protrudes from the first conductive surface in a direction opposite to the second conductive surface.

Preferably, the mould further includes an upper mould and a lower mould which can move toward or away from the upper mould, and the upper mould consists of the conductive layer and the insulating layer.

Preferably, the second conductive units further includes an adjustment section which is electrically connected to the second outer conductive section and disposed within the insulating layer and located between the heating portion and the first inner conductive section.

Preferably, the adjustment section is provided with a hole aligned with the heating portion.

Preferably, the second conductive units further includes a covering section which is electrically connected to the second outer conductive section and disposed within the insulating layer and located between the first inner conductive section and the second insulating surface.

Preferably, the first and second conductive units each have a flat shape. Preferably, the first electrode portion of the first conductive unit includes a first inserting hole, the first connecting portion, the first inner conductive section and the first outer conductive section are tubular-shaped, the first connecting portion is inserted in the first inserting hole, the second electrode portion of the second conductive unit includes a second inserting hole, the second outer conductive section is a tubular structure inserted in the second inserting hole and sleeved onto the first outer conductive section in an insulating manner, the second conductive unit further includes a tubular adjustment section which is electrically connected to the second outer conductive section and disposed within the insulating layer and sleeved onto the first inner conductive section in an insulating manner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Figure 1:
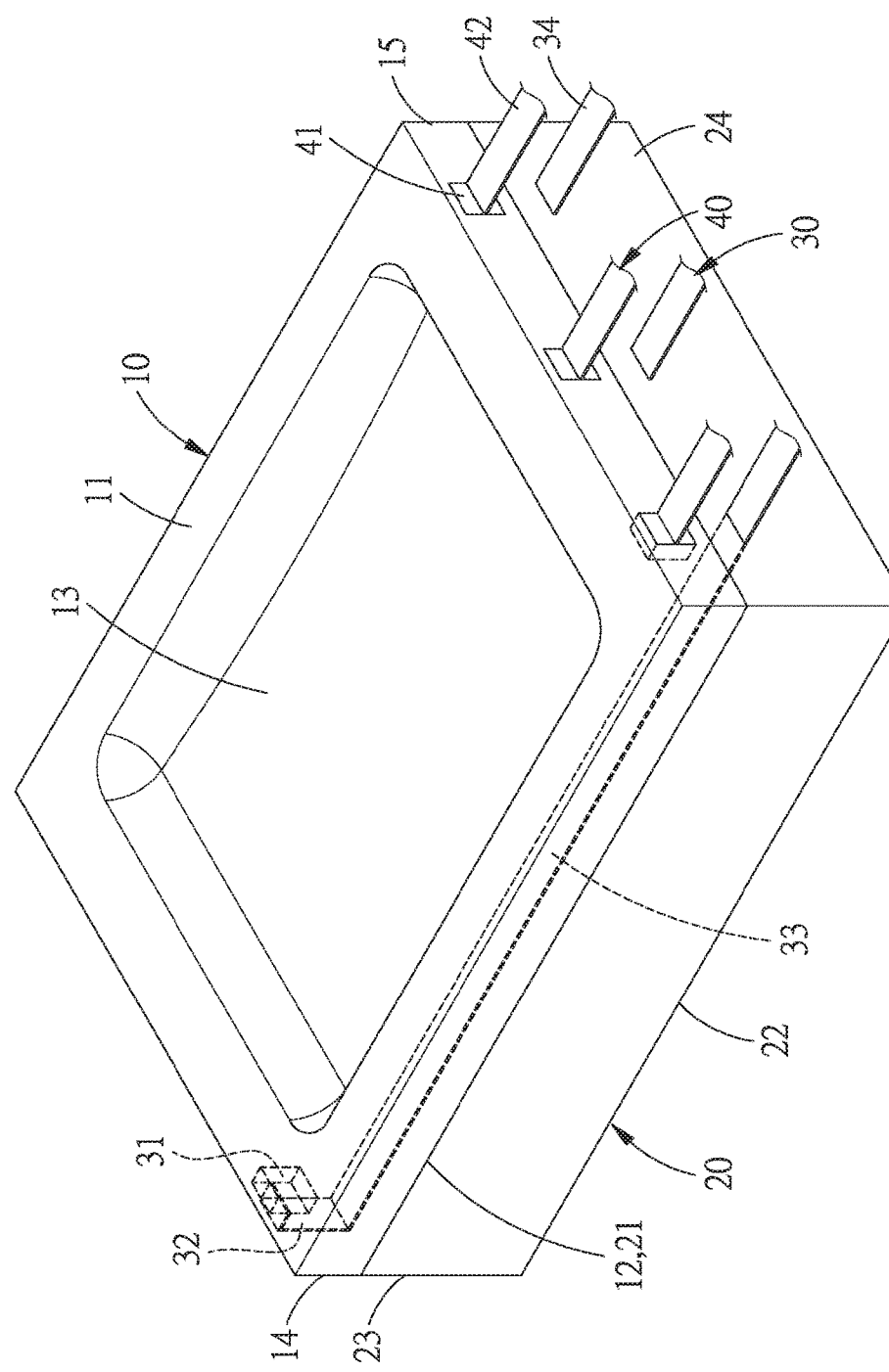
FIG. 1 is a perspective view of a mould with a heating device in accordance with a first preferred embodiment of the present invention.
Figure 2:
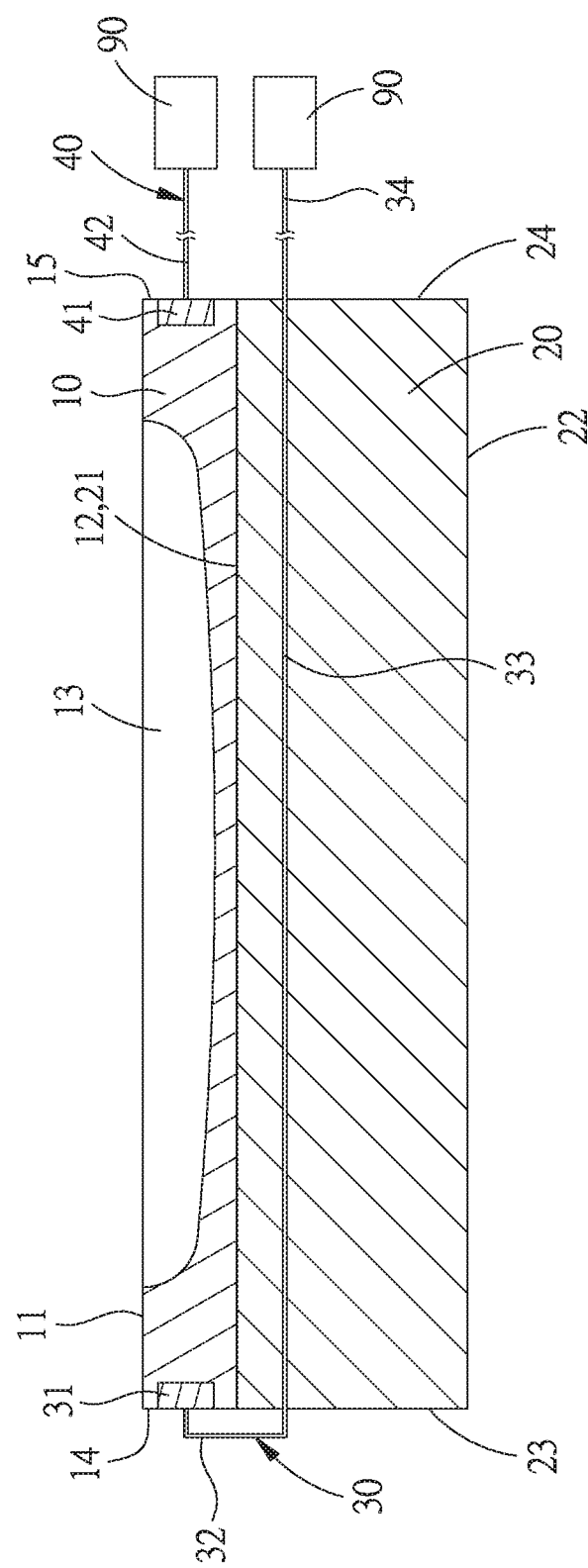
FIG. 2 is a cross sectional view of the mould with a heating device in accordance with a first preferred embodiment of the present invention.
Figure 3:
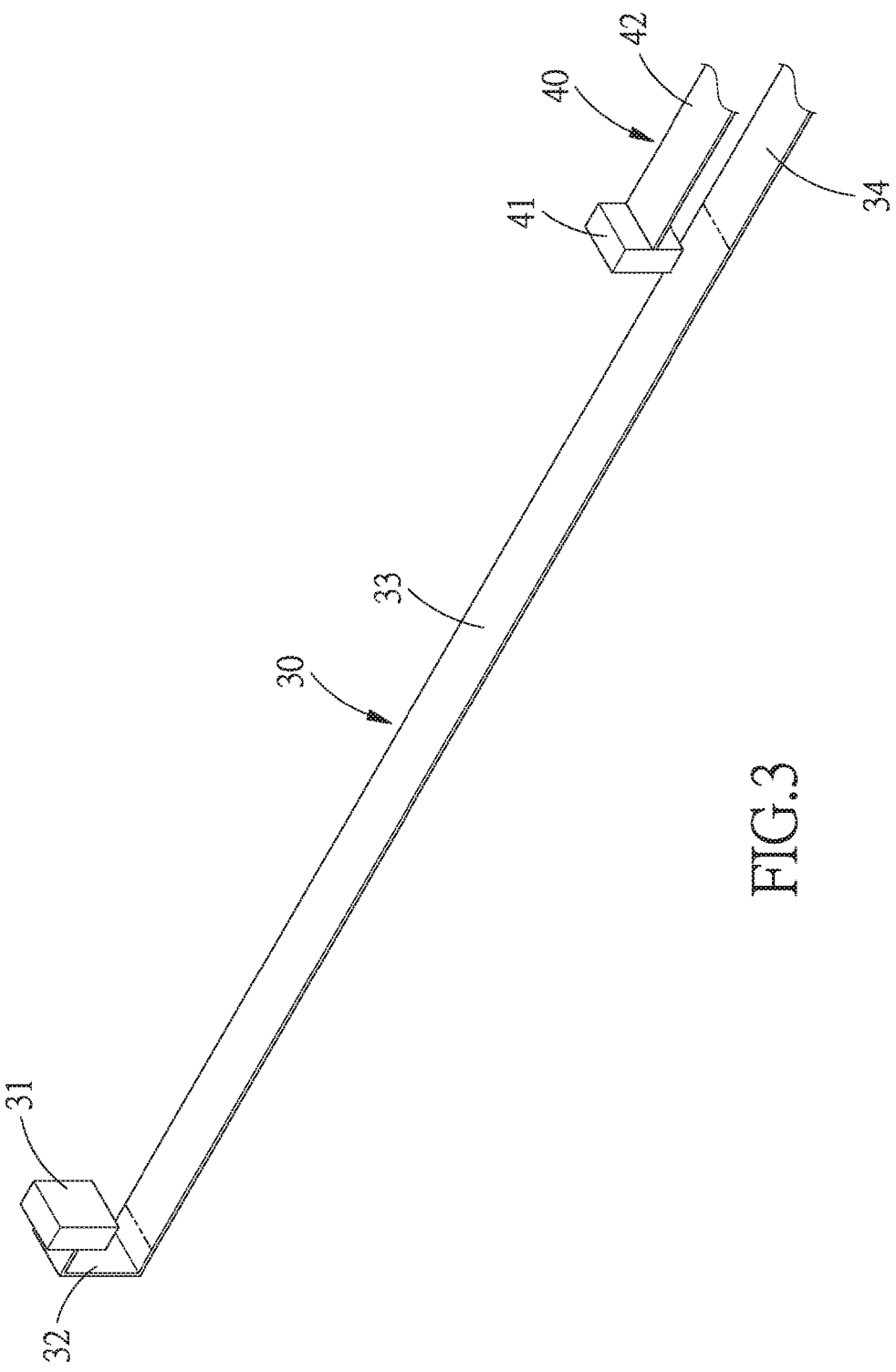
FIG. 3 is a perspective view of the mould with the heating device in accordance with the first preferred embodiment of the present invention, showing a first conductive unit and a second conductive unit.

Referring to FIGS. 1-3, a mould with a heating device in accordance with the first preferred embodiment of the present invention comprises: a conductive layer 10, an insulating layer 20, and the heating device.

The conductive layer 10 is made of steel (or aluminum), and includes a first conductive surface 11, a second conductive surface 12 opposite to the first conductive surface 11, a heating portion 13 disposed on the first conductive surface 11, and a first conductive lateral surface 14 and a second conductive lateral surface 15 which are connected to the first and second conductive surfaces 11, 12. In this embodiment, the heating portion 13 is a recess recessed from the first conductive surface 11 toward the second conductive surface 12, and the first and second conductive lateral surfaces 14, 15 are located at two sides of FIG. 2.

The insulating layer 20 is mounted on the conductive layer 10 in an insulated manner, and includes a first insulating surface 21 mounted on the second conductive surface 12, an opposite second insulating surface 22, and a first insulating lateral surface 23 and a second insulating lateral surface 24 which are connected to the first and second insulating surfaces 21, 22 and located on the same side as the first and second conductive lateral surfaces 14, 15. In this embodiment, the insulating between the insulating layer 20 and the conductive layer 10 can be achieved by insulating treatment or anodizing treatment. The insulating layer 20 can be made of stone or ceramic material, and can also be insulated from the conductive layer 10.

The heating device includes three first conductive units 30 and three second conductive units 40.

Each of the three first conductive units 30 includes: a first electrode portion 31 electrically connected to the first conductive lateral surface 14, a first connecting portion 32 electrically connected to the first electrode portion 31 and insulated from the conductive layer 10, a first inner conductive section 33 electrically connected to the first connecting portion 32 and disposed inside the insulating layer 20 and aligned to the heating portion 13, and a first outer conductive section 34 electrically connected to the first inner conductive section 33 and located outside the second insulating lateral surface 24. In this embodiment, each of the first outer conductive sections 34 is a flat structure connected to a power source 90. Each of the conductive units 30 is made of copper or covered with silver or gold.

Each of the second conductive units 40 includes: a second electrode portion 41 electrically connected to the second conductive lateral surface 15, and a second outer conductive section 42 electrically connected to the second electrode portion 41 and located outside the second insulating lateral surface 24 and insulated from the first outer conductive section 34. The second outer conductive section 42 is located at the same side as the first outer conductive section 34. In this embodiment, each of the second outer conductive sections 42 is a flat structure connected to a power source 90, and each of the second conductive units 40 is made of copper or covered with silver or gold.

The first outer conductive sections 34 of the first conductive units 30 and the second outer conducive sections 42 of the second conductive units 40 are located outside the second insulating lateral surface and disposed at the same side, and each of the first conducive units 30 includes the first inner conductive section 33 aligned to the heating portion 13 of the conducive layer 10. With the arrangement of the first and second conductive units 30, 40, the current path flowing through the conductive layer 10 can be controlled to allow the current to be collected or gathered at the first conductive surface 11 of the conductive layer 10, particularly in the surface of the heating portion 13, so as to preheat the mould cavity from room temperature to working temperature, and the heating effect of the heating portion of the mould can be improved. Meanwhile, it is convenient for the first outer conductive sections 34 of the first conductive units 30 and the second outer conducive sections 42 of the second conductive units 40 to connect to the power source 90.

Figure 4:
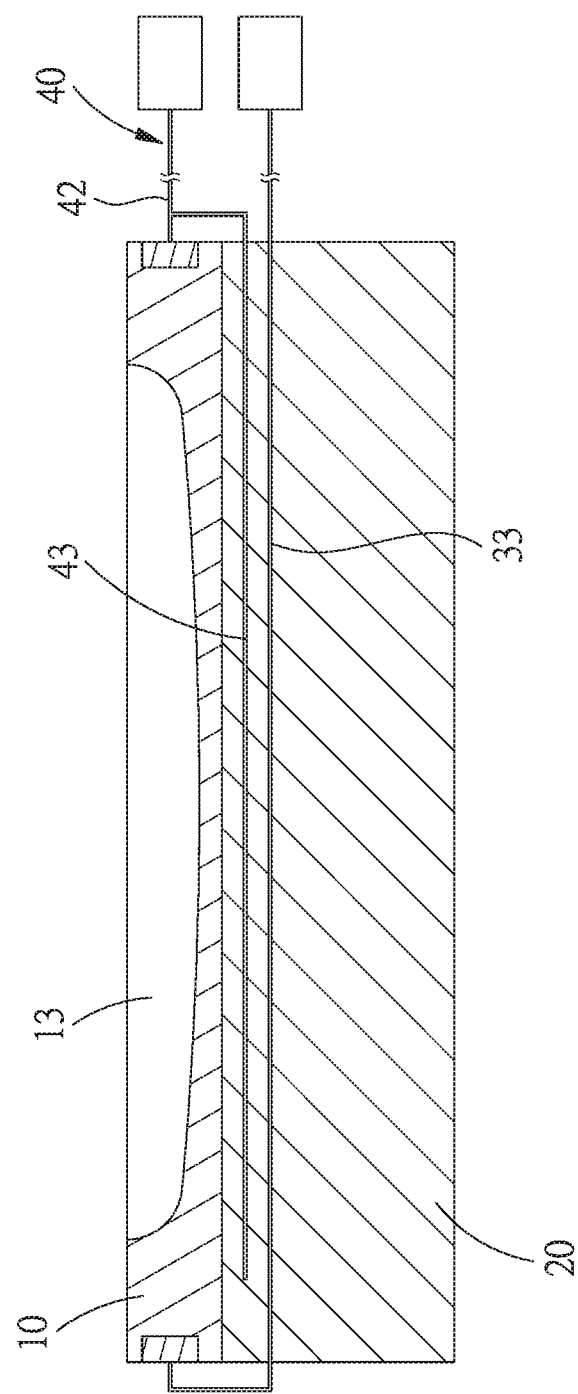
FIG. 4 is a cross sectional view of the mould with a heating device in accordance with a second preferred embodiment of the present invention.
Figure 5:
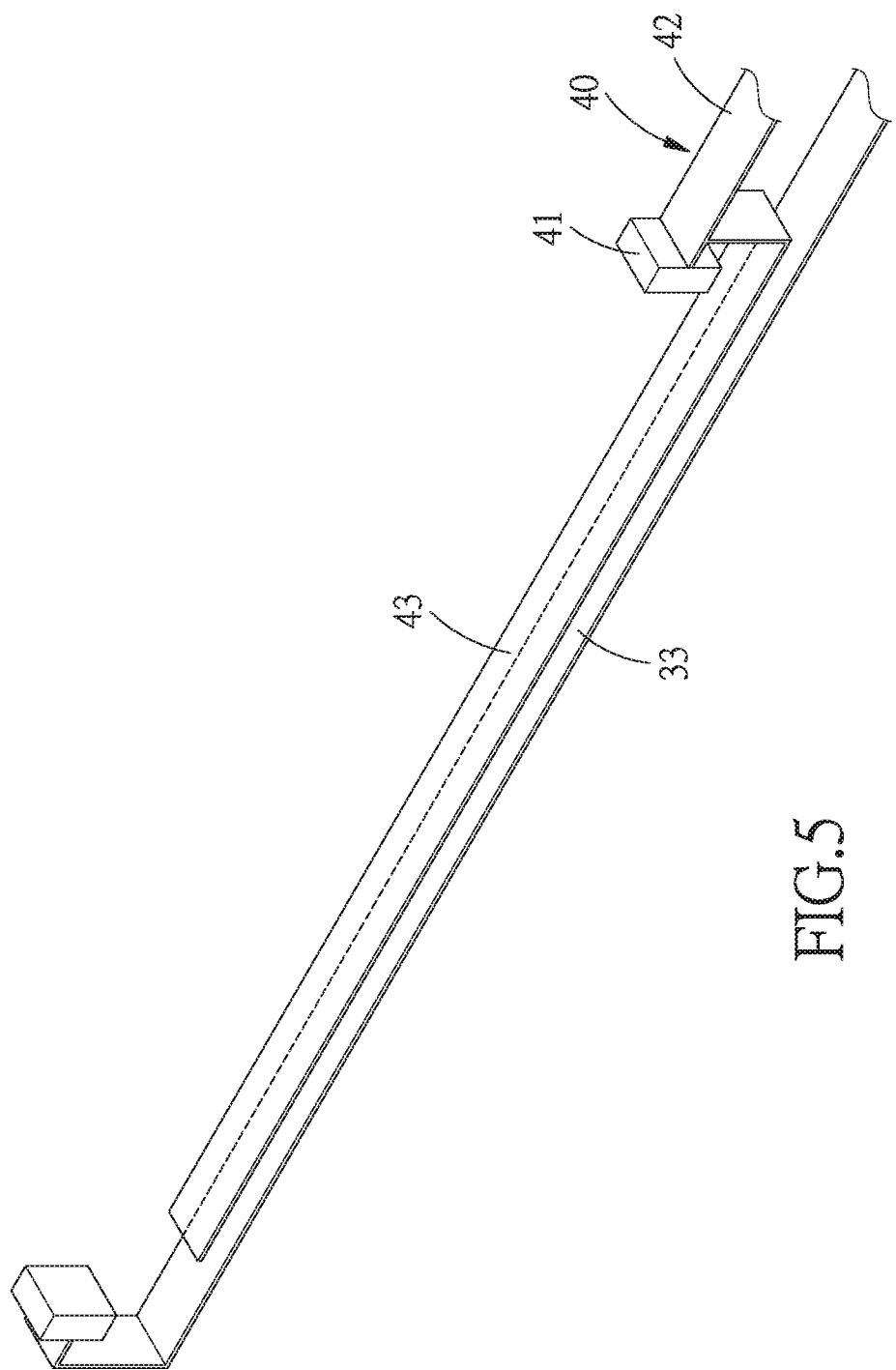
FIG. 5 is a perspective view of the mould with the heating device in accordance with the second preferred embodiment of the present invention, showing a first conductive unit and a second conductive unit.

Referring to FIGS. 4 and 5, a mould with a heating device in accordance with the second preferred embodiment of the present invention also comprises: a conductive layer 10, an insulating layer 20, and the heating device, and is similar to the first embodiment, except that:

Each of the second conductive units 40 further includes an adjustment section 43 which is electrically connected to the second outer conductive section 42 and disposed within the insulating layer 20 and located between the heating portion 13 and the first inner conductive section 33. Therefore, the current path flowing through the conductive layer 10 can be controlled to allow the current to be collected or gathered at the heating portion 13, so as to preheat the mould cavity from room temperature to working temperature, and the heating effect of the heating portion of the mould can also be improved.

Figure 6:
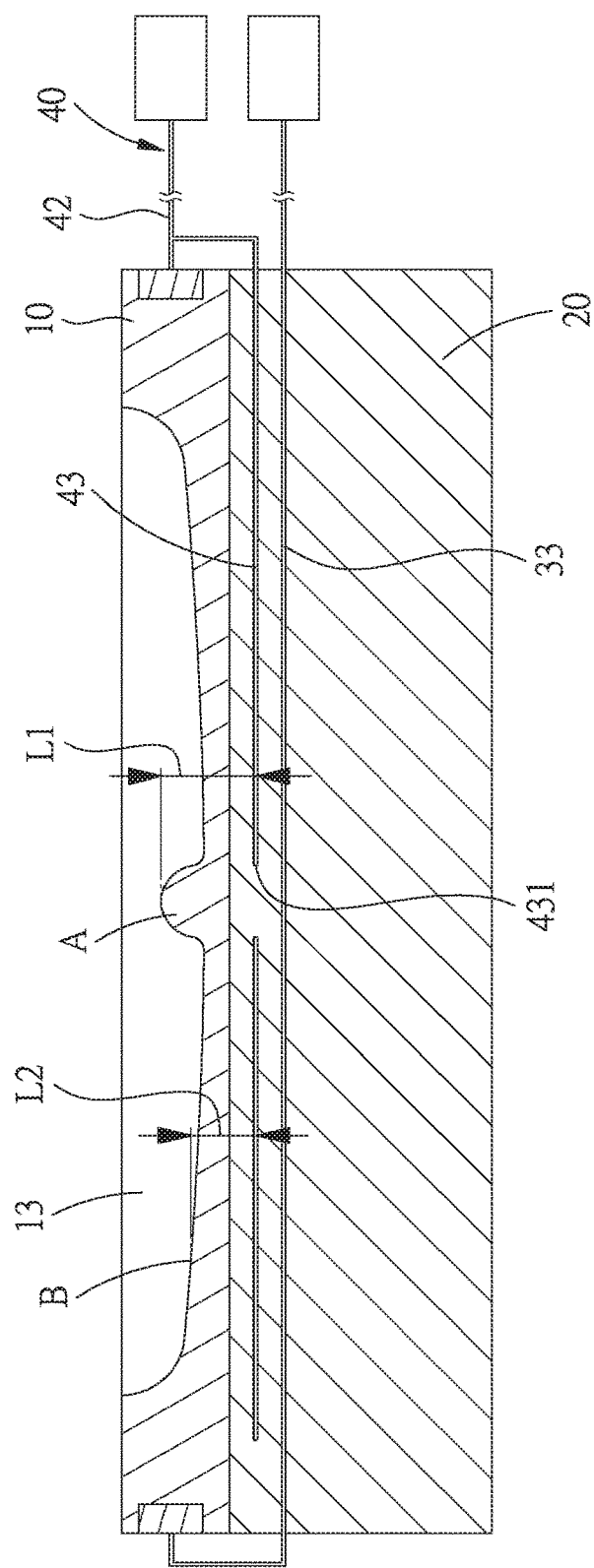
FIG. 6 is a cross sectional view of the mould with a heating device in accordance with a third preferred embodiment of the present invention.

Referring to FIG. 6, a mould with a heating device in accordance with the third preferred embodiment of the present invention also comprises: a conductive layer 10, an insulating layer 20, and the heating device, and is similar to the second embodiment, except that:

The adjustment section 43 of each of the second conductive units 40 is provided with a hole 431 aligned with the heating portion 13, and the optimal positions of the hole 431 is arranged based on the distance between the heating portion 13 and the adjustment section 43. For example, as shown in FIG. 6, the distance L1 from the surface of the heating portion 13 to the adjustment section 43 in the first position A of the heating portion 13 is larger than the distance L2 from the surface of the heating portion 13 to the adjustment section 43 in the second position B of the heating portion 13, therefore, the hole 431 of the adjustment section 43 can be arranged at the position aligned to the first position A of the adjustment section 43. By such an arrangement, the current path flowing through the conductive layer 10 can be controlled to allow the current to be collected or gathered at the heating portion 13, so as to preheat the mould cavity from room temperature to working temperature, and the heating effect of the heating portion of the mould can also be improved.

Figure 7:
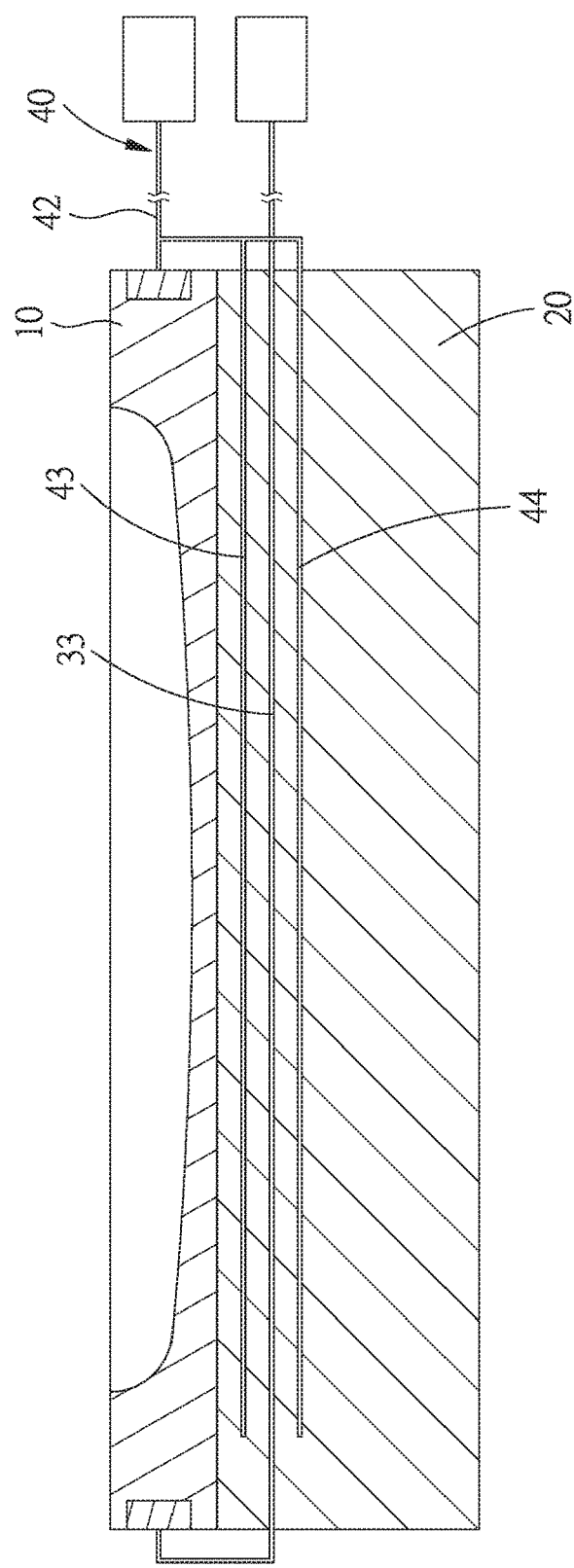
FIG. 7 is a cross sectional view of the mould with a heating device in accordance with a fourth preferred embodiment of the present invention.
Figure 8:
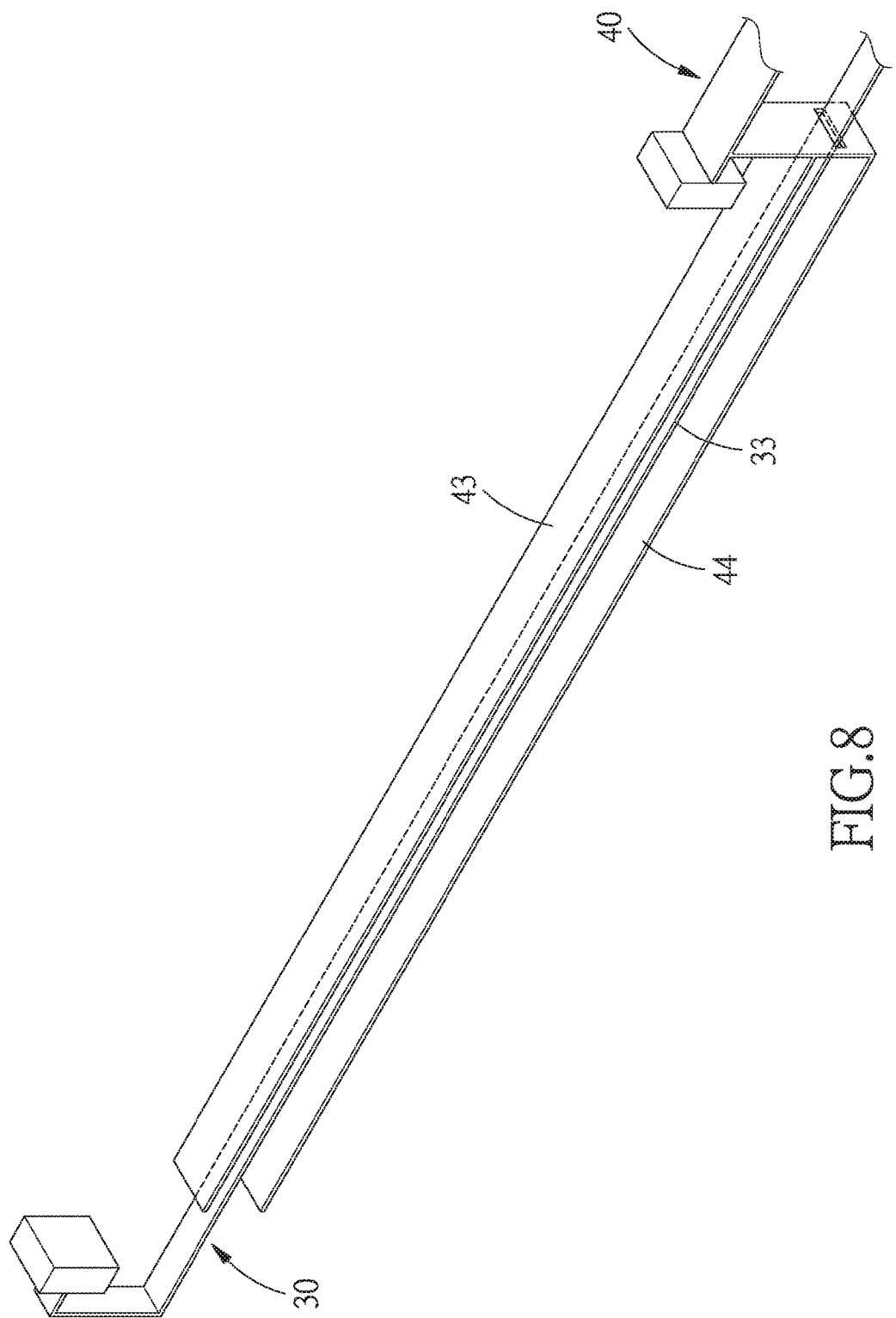
FIG. 8 is a perspective view of the mould with the heating device in accordance with the fourth preferred embodiment of the present invention, showing a first conductive unit and a second conductive unit.

Referring to FIGS. 7 and 8, a mould with a heating device in accordance with the fourth preferred embodiment of the present invention also comprises: a conductive layer 10, an insulating layer 20, and the heating device, and is similar to the second embodiment, except that:

Each of the second conductive units 40 further includes a covering section 44 which is electrically connected to the second outer conductive section 42 and disposed within the insulating layer 20 and located between the first inner conductive section 33 and the second insulating surface 24. Therefore, the current path flowing through the conductive layer 10 can be controlled to allow the current to be collected or gathered at the heating portion 13, so as to preheat the mould cavity from room temperature to working temperature, and the heating effect of the heating portion of the mould can also be improved. It is to be noted that the covering section 44 is still insulated from the first conductive units 30.

Figure 9:
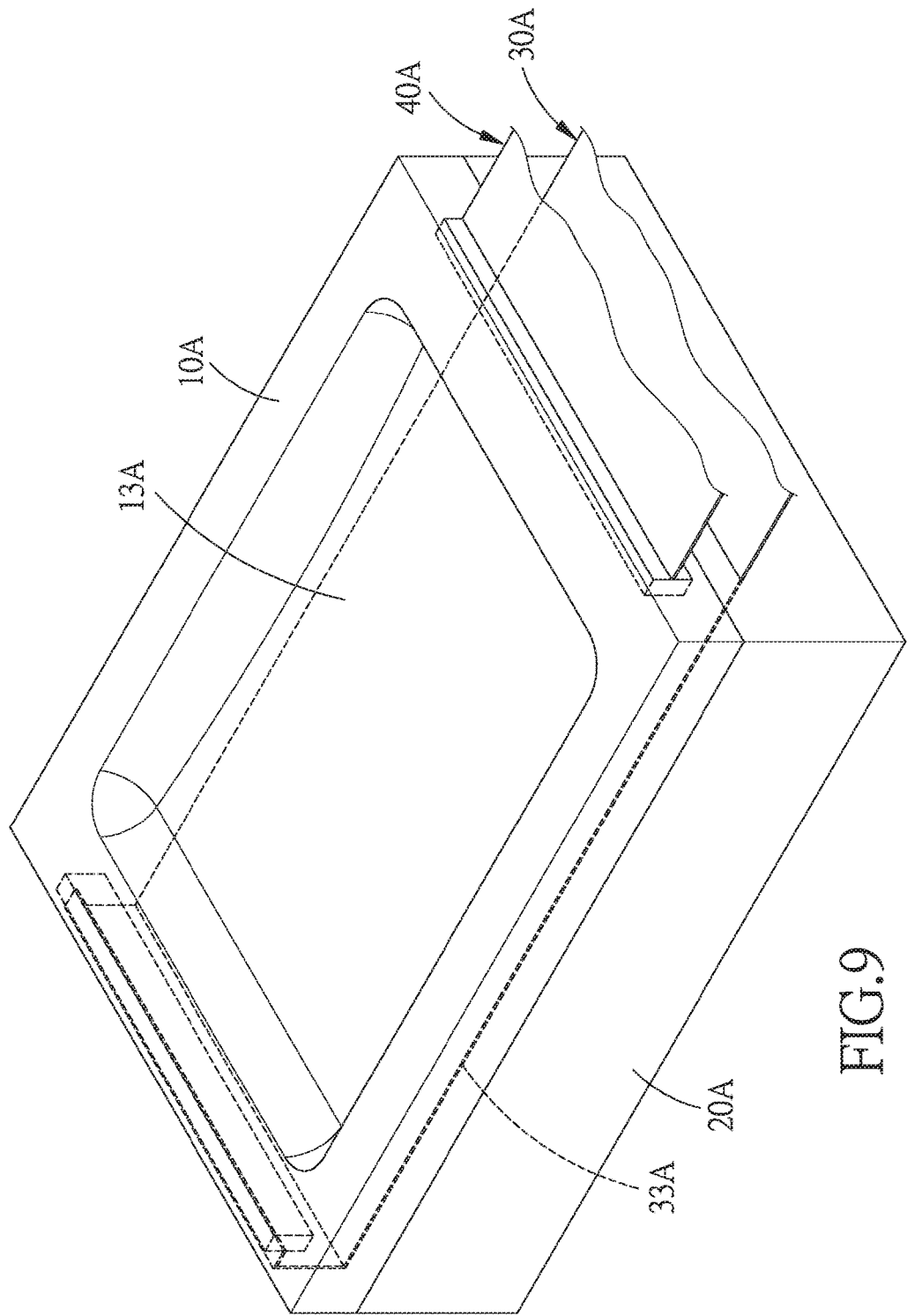
FIG. 9 is a cross sectional view of the mould with a heating device in accordance with a fifth preferred embodiment of the present invention.
Figure 10:
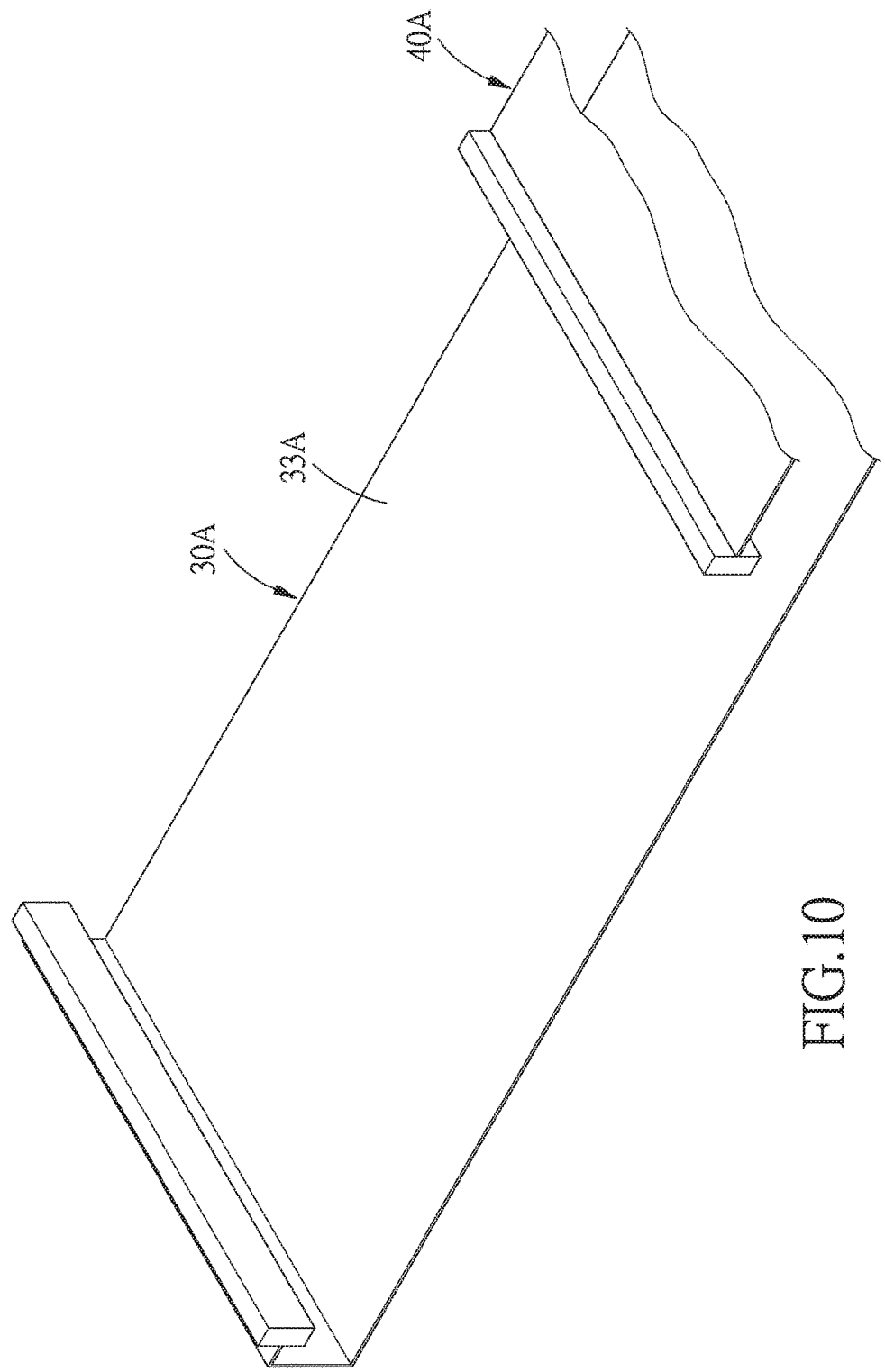
FIG. 10 is a perspective view of the mould with the heating device in accordance with the fifth preferred embodiment of the present invention, showing a first conductive unit and a second conductive unit.

Referring to FIGS. 9 and 10, a mould with a heating device in accordance with the fifth preferred embodiment of the present invention also comprises: a conductive layer 10A, an insulating layer 20A, and the heating device, and is similar to the first embodiment, except that:

There is only one conductive layer 10A and one insulating layer 20A, and they are all flat structured. The area of the first inner conductive section 33A of the first conductive unit 30A corresponds to the area of the heating portion 13A of the conductive layer 10A, which improves the heating effect of the heating portion of the mould.

Figure 11:
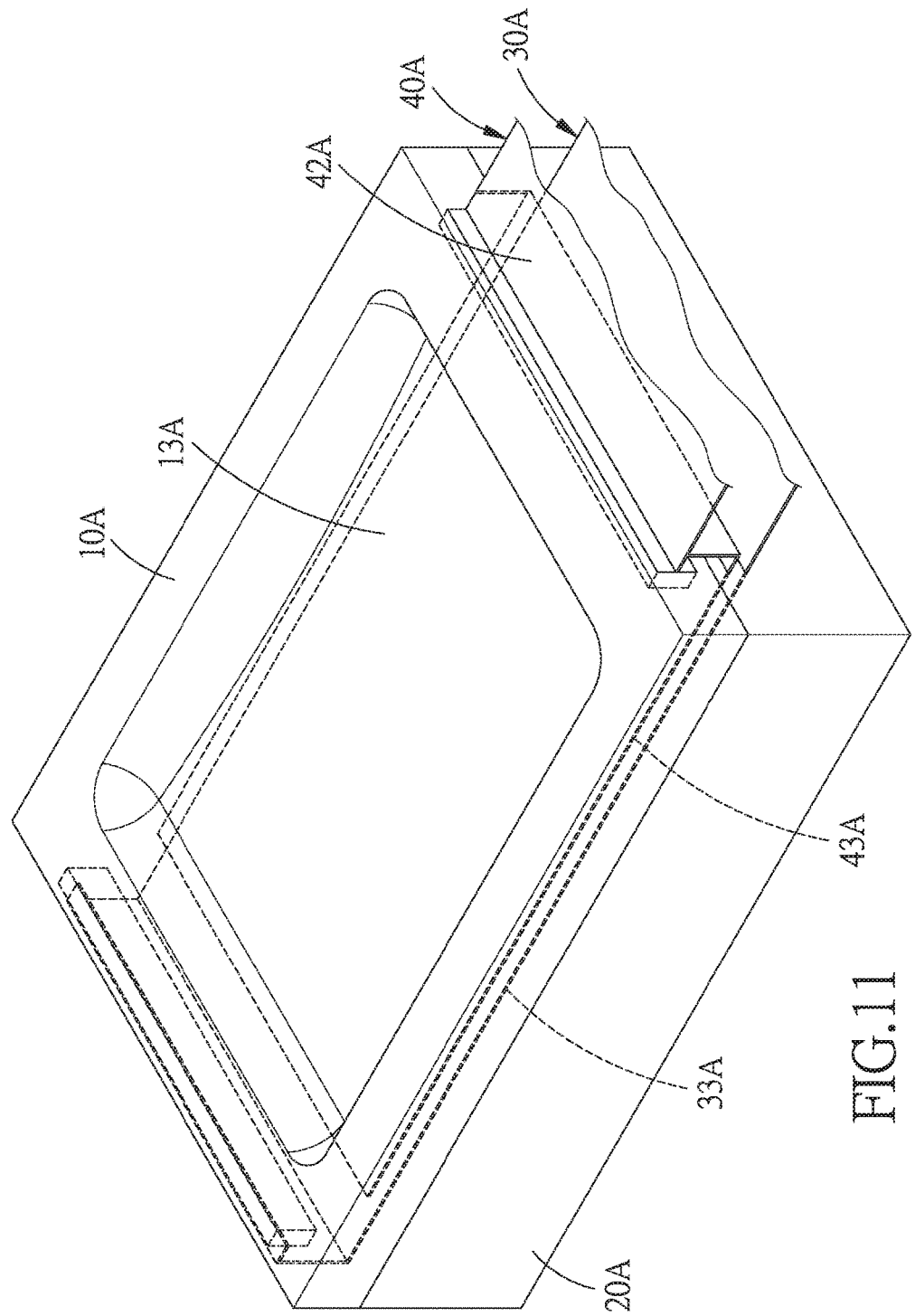
FIG. 11 is a cross sectional view of the mould with a heating device in accordance with a sixth preferred embodiment of the present invention.
Figure 12:
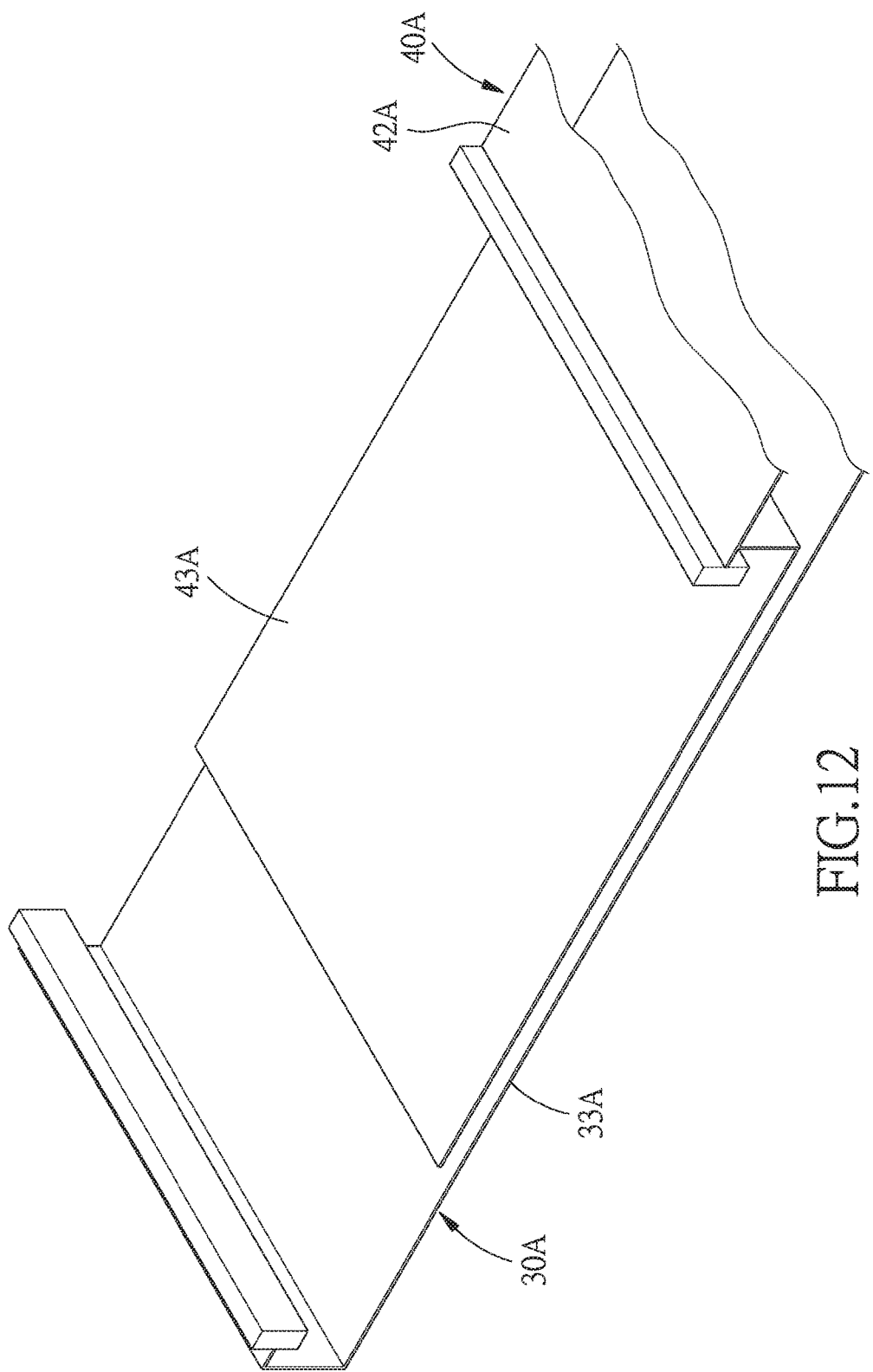
FIG. 12 is a perspective view of the mould with the heating device in accordance with the sixth preferred embodiment of the present invention, showing a first conductive unit and a second conductive unit.

Referring to FIGS. 11 and 12, a mould with a heating device in accordance with the sixth preferred embodiment of the present invention also comprises: a conductive layer 10A, an insulating layer 20A, and the heating device, and is similar to the first embodiment, except that:

There is only one conductive layer 10A and one insulating layer 20A, and they are all flat structured. The area of the first inner conductive section 33A of the first conductive unit 30A corresponds to the area of the heating portion 13A of the conductive layer 10A. The second conductive unit 40A further includes an adjustment section 43 which is electrically connected to the second outer conductive section 42A and disposed within the insulating layer 20A and located between the heating portion 13A and the first inner conductive section 33A. Therefore, the current path flowing through the conductive layer 10A can be controlled to allow the current to be collected or gathered at the heating portion 13A, so as to preheat the mould cavity from room temperature to working temperature, and the heating effect of the heating portion of the mould can also be improved.

Figure 13:
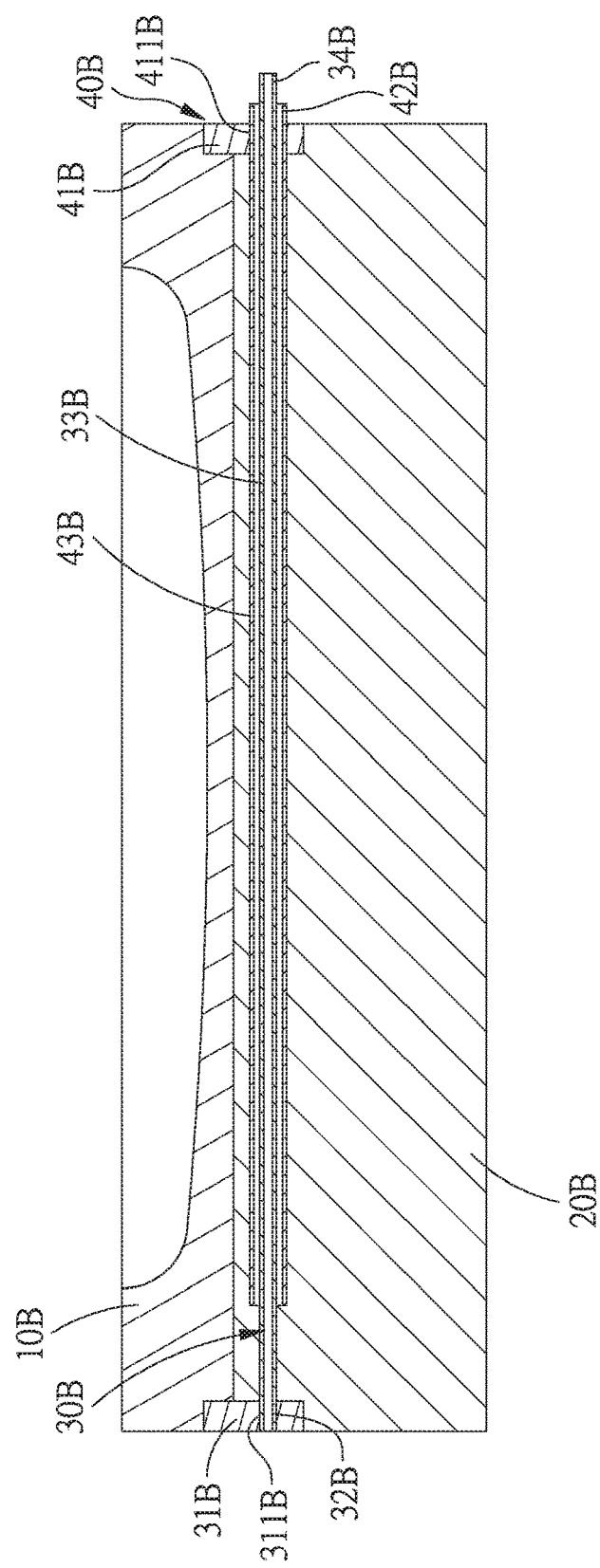
FIG. 13 is a cross sectional view of the mould with a heating device in accordance with a seventh preferred embodiment of the present invention.
Figure 14:
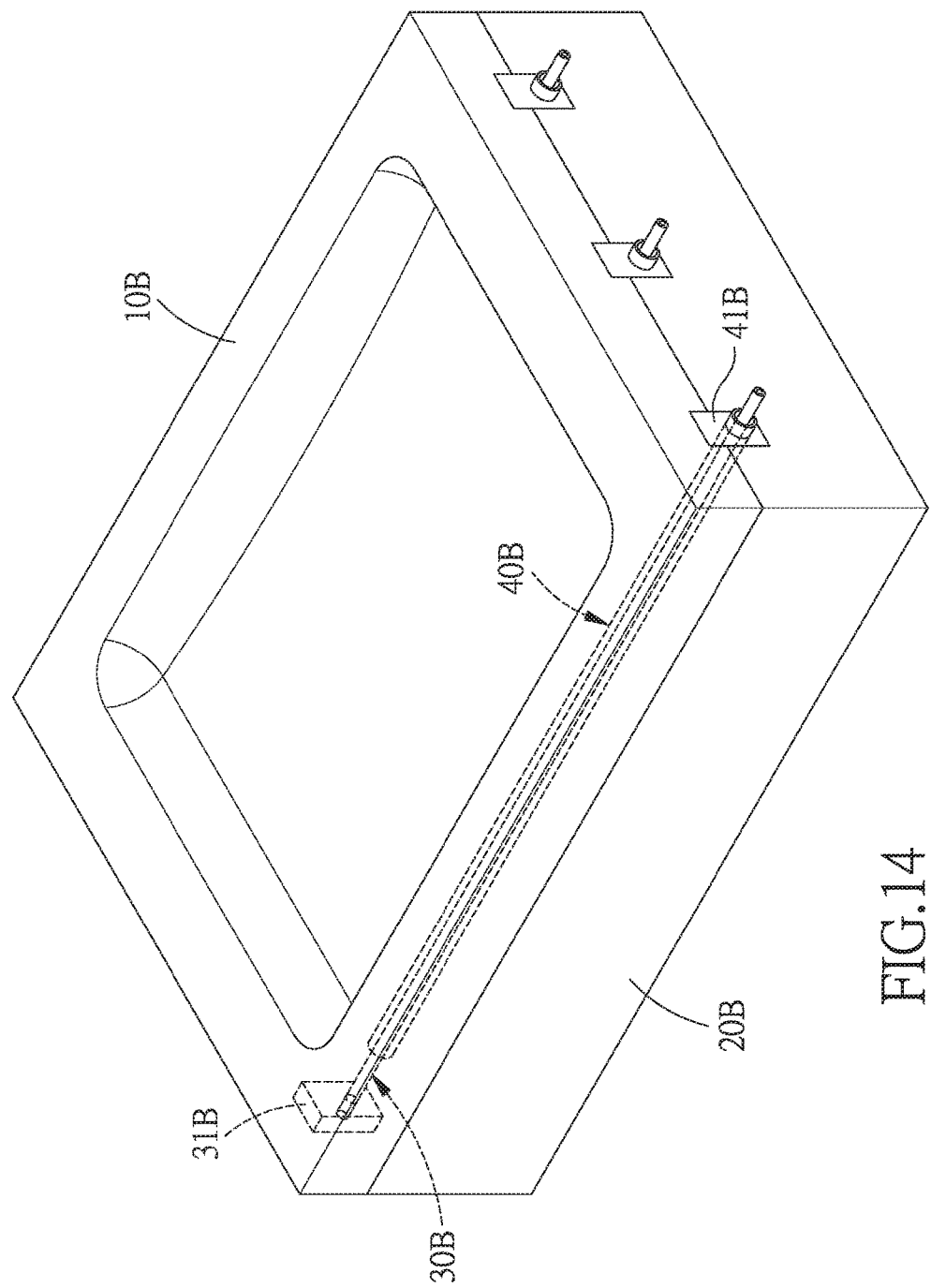
FIG. 14 is a perspective view of the mould with a heating device in accordance with a seventh preferred embodiment of the present invention.
Figure 15:
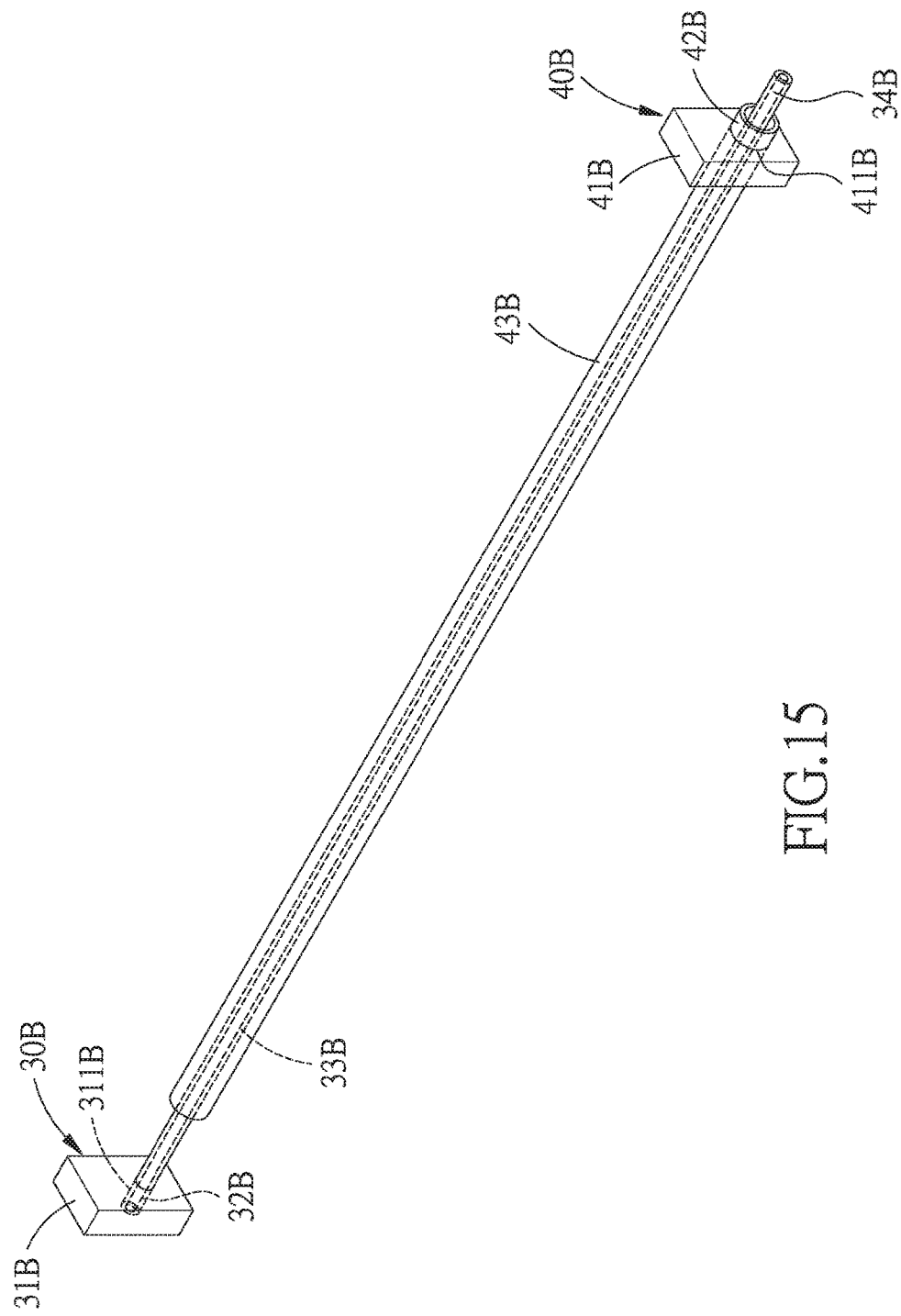
FIG. 15 is a perspective view of the mould with the heating device in accordance with the seventh preferred embodiment of the present invention, showing a first conductive unit and a second conductive unit.

Referring to FIGS. 13-14, a mould with a heating device in accordance with the seventh preferred embodiment of the present invention also comprises: a conductive layer 10B, an insulating layer 20B, and the heating device, and is similar to the first embodiment, except that:

The first electrode portion 31B of each of the first conductive units 30B includes a first inserting hole 311B. The first connecting portion 32B, the first inner conductive section 33B and the first outer conductive section 34B are tubular-shaped, and the first connecting portion 32B is inserted in the first inserting hole 311B. The second electrode portion 41B of each of the second conductive units 40B includes a second inserting hole 411B. The second outer conductive section 42B is a tubular structure inserted in the second inserting hole 411B and sleeved onto the first outer conductive section 34B in an insulating manner. Each of the second conductive units 40B further includes a tubular adjustment section 43B which is electrically connected to the second outer conductive section 42B and disposed within the insulating layer 20B and sleeved onto the first inner conductive section 33B in an insulating manner, which improves the heating effect of the heating portion of the mould.

Figure 16:
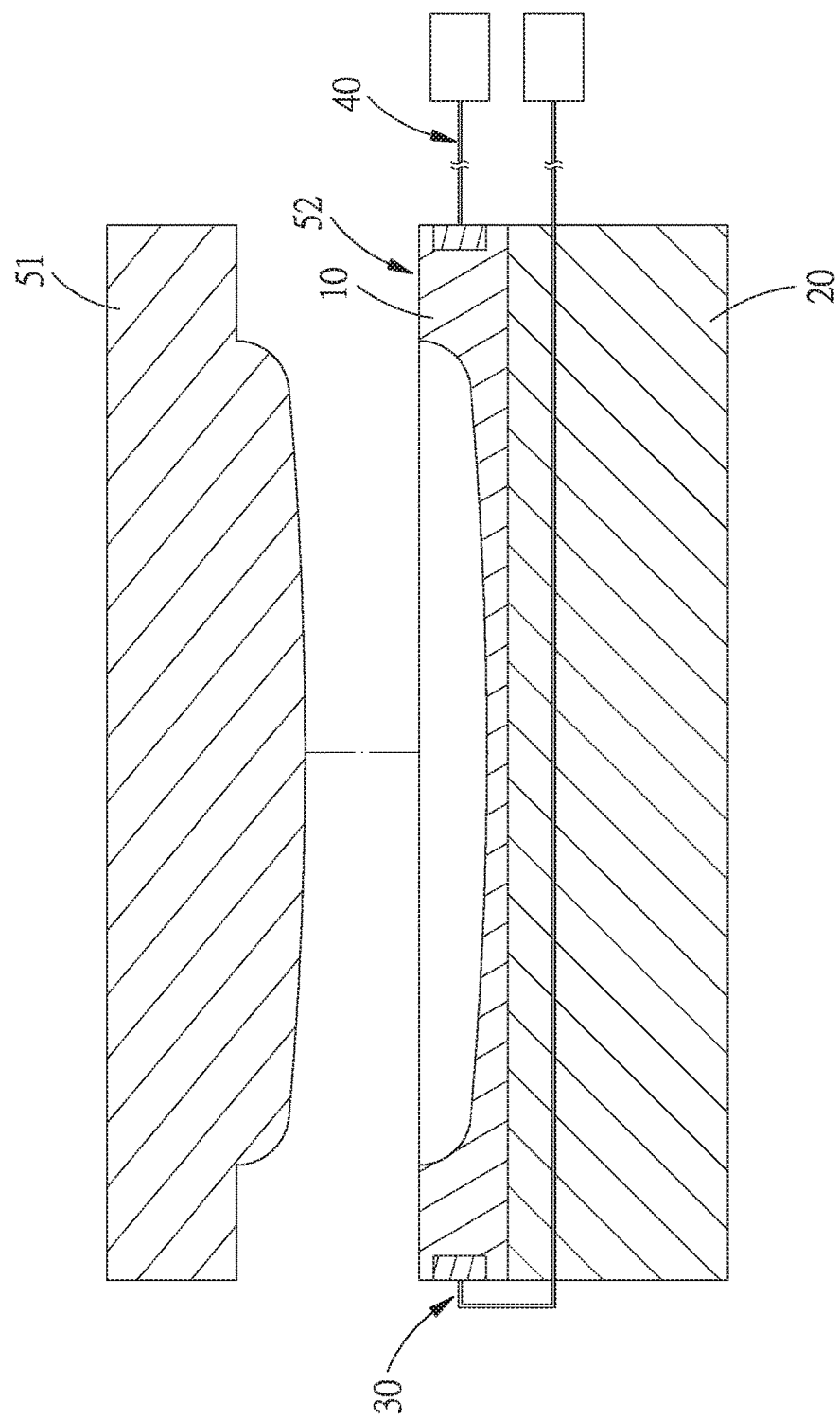
FIG. 16 is a perspective view of the mould with the heating device in accordance with an eighth preferred embodiment of the present invention.

Referring to FIG. 16, a mould with a heating device in accordance with the eighth preferred embodiment of the present invention also comprises: a conductive layer 10, an insulating layer 20, and the heating device, and is similar to the first embodiment, except that:

The mould further includes an upper mould 51 and a lower mould 52 which can move toward or away from the upper mould 51. The lower mould 52 consists of the conductive layer 10 and the insulating layer 20. The first and second conductive units 30, 40 of the heating device are disposed on the lower mould 52.

Figure 17:
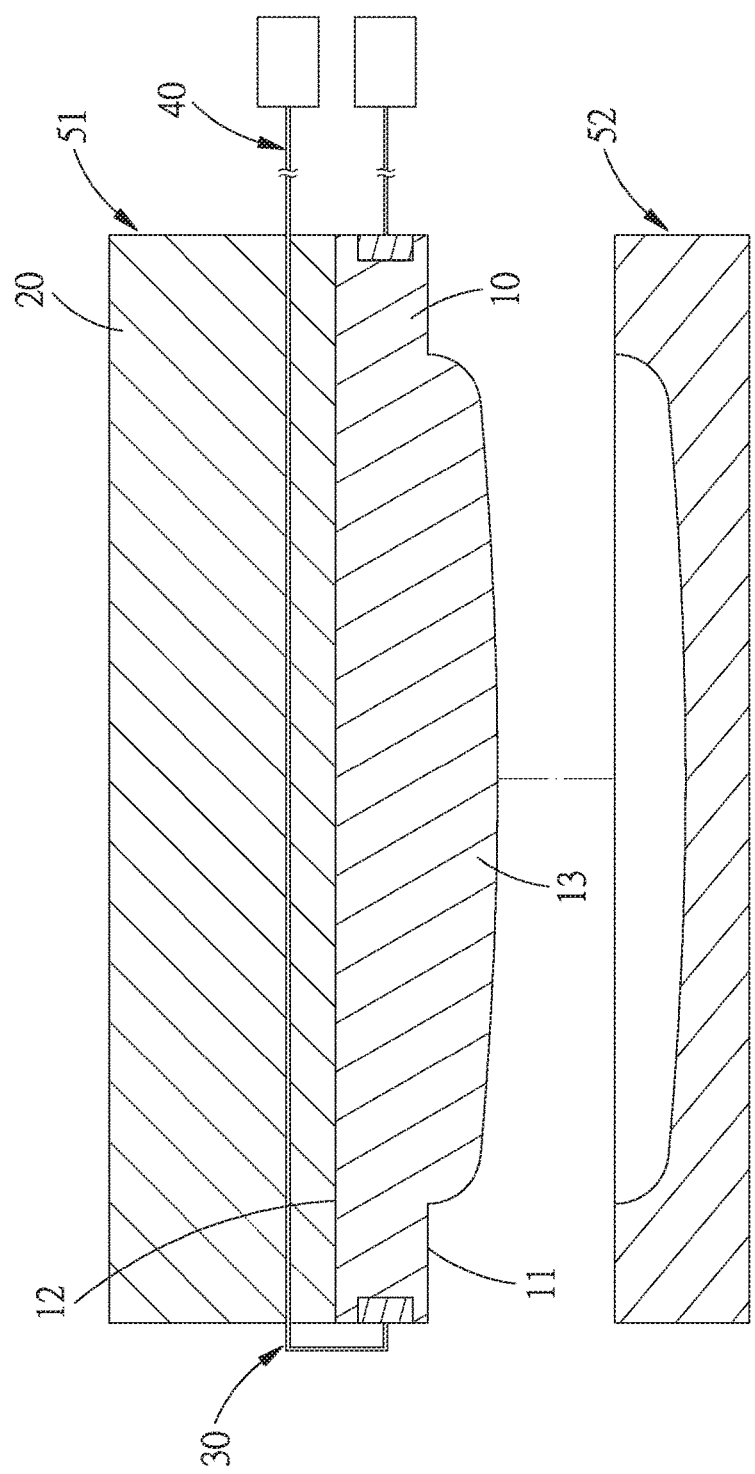
FIG. 17 is a perspective view of the mould with the heating device in accordance with a ninth preferred embodiment of the present invention.

Referring to FIG. 17, a mould with a heating device in accordance with the ninth preferred embodiment of the present invention also comprises: a conductive layer 10, an insulating layer 20, and the heating device, and is similar to the first embodiment, except that:

The mould further includes an upper mould 51 and a lower mould 52 which can move toward or away from the upper mould 51. The upper mould 51 consists of the conductive layer 10 and the insulating layer 20. The first and second conductive units 30, 40 of the heating device are disposed on the upper mould 51. The heating portion 13 of the conductive layer 10 protrudes from the first conductive surface 11 in a direction opposite to the second conductive surface 12.

While we have shown and described various embodiments in accordance with the present invention, it is clear to those skilled in the art that further embodiments may be made without departing from the scope of the present invention.

What is claimed is:

1. A mould with a heating device, comprising:
  a conductive layer including a first conductive surface, a second conductive surface opposite to the first conductive surface, a heating portion disposed on the first conductive surface, and a first conductive lateral surface and a second conductive lateral surface which are connected to the first and second conductive surfaces;
  an insulating layer mounted on the conductive layer in an insulated manner, and including a first insulating surface connected to the second conductive surface, an opposite second insulating surface, and a first insulating lateral surface and a second insulating lateral surface which are connected to the first and second insulating surfaces, and located on the same side as the first and second conductive lateral surfaces;
  the heating device including at least one first conductive units and at least one second conductive units; wherein
  the first conductive units includes: a first electrode portion electrically connected to the first conductive lateral surface, a first connecting portion electrically connected to the first electrode portion and insulated from the conductive layer, a first inner conductive section electrically connected to the first connecting portion and disposed inside the insulating layer and aligned to the heating portion, and a first outer conductive section electrically connected to the first inner conductive section and located outside the second insulating lateral surface;
  the second conductive units includes: a second electrode portion electrically connected to the second conductive lateral surface, a second outer conductive section electrically connected to the second electrode portion and located outside the second insulating lateral surface and insulated from the first outer conductive section, and an adjustment section which is electrically connected to the second outer conductive section and disposed within the insulating layer, the adjustment section is located between the heating portion and the first inner conductive section, and provided with a hole aligned with the heating portion.

2. The mould with the heating device as claimed in claim 1, wherein the heating portion is a recess recessed from the first conductive surface toward the second conductive surface.

3. The mould with the heating device as claimed in claim 2, wherein the mould further includes an upper mould and a lower mould which can move toward or away from the upper mould, and the lower mould consists of the conductive layer and the insulating layer.

4. The mould with the heating device as claimed in claim 1, wherein the heating portion of the conductive layer protrudes from the first conductive surface in a direction opposite to the second conductive surface.

5. The mould with the heating device as claimed in claim 4, wherein the mould further includes an upper mould and a lower mould which can move toward or away from the upper mould, and the upper mould consists of the conductive layer and the insulating layer.

6. The mould with the heating device as claimed in claim 1, wherein the second conductive units further includes a covering section which is electrically connected to the second outer conductive section and disposed within the insulating layer and located between the first inner conductive section and the second insulating surface.

7. The mould with the heating device as claimed in claim 1, wherein the first and second conductive units each have a flat shape.

8. The mould with the heating device as claimed in claim 1, wherein the first electrode portion of the first conductive unit includes a first inserting hole, the first connecting portion, the first inner conductive section and the first outer conductive section are tubular-shaped, the first connecting portion is inserted in the first inserting hole, the second electrode portion of the second conductive unit includes a second inserting hole, the second outer conductive section is a tubular structure inserted in the second inserting hole and sleeved onto the first outer conductive section in an insulating manner, the second conductive unit further includes a tubular adjustment section which is electrically connected to the second outer conductive section and disposed within the insulating layer and sleeved onto the first inner conductive section in an insulating manner.

* * * * *